Patented Feb. 4, 1930

1,745,360

UNITED STATES PATENT OFFICE

FRANZIE ANTOINETTE DE SILVA, OF WESTMINSTER, AND CHARLES GEORGE CARLISLE, OF SHEFFIELD, ENGLAND

DIRECT PRODUCTION OF STEEL OR STEEL ALLOYS FROM TITANIFEROUS ORES AND IRON SANDS

No Drawing. Application filed July 30, 1927, Serial No. 210,024, and in Great Britain May 18, 1927.

This invention relates to the direct production of steel or steel alloys from titaniferous ores and iron sands.

Although titanium is one of the most widely distributed chemical elements and ranks ninth among the elements in abundance, steel or steel alloys made from titaniferous ores or iron sands, are not produced at the present time on an industrial or commercial scale. One of the objections raised by iron smelters to the reduction of titaniferous ores and iron sands so as to obtain pig iron, has been the fact that they give a pasty slag; that the aggregation of titanium nitride and nitro-cyanide in the blast furnace renders work extremely difficult, while the fuel consumption and the cost of production is much higher than is the case with ordinary ores. Furthermore, and owing to the high temperature at which the ores are reduced, and in cases where it has been proposed to use an electric furnace to obtain the requisite high temperatures, the wear and tear on the furnace linings by any of the ordinary methods hitherto adopted has been excessive, while the value of the yield of metal has been out of all proportion to the cost involved in reducing the same.

In order to avoid the production of a pasty slag, and in view of the fact that slag containing titanium oxide is of considerable commercial value, especially for use in the production of pigments, cements, nitrates, fertilizers etc. it has been proposed to carry on the reducing process with the aid of special reducing agents such as calcium silicide so as to obtain a slag which is free or practically free from iron as also iron which is free or practically free from titanium, but in such processes the primary product aimed at was a stable slag intended for use as aforesaid in the production of titanium paint pigments, while the metal resulting from the process was iron.

When, however, it is a question of producing steel from iron sands or titaniferous ores by electrical methods, as distinct from proposals to reduce the iron sands or the ores to produce pig iron, the conditions are entirely different, for, in the former case, it is only a question of producing the impure metal itself, whereas in the latter case it is a question of producing a pure metal containing definite proportions of carbon or other ingredients so as to obtain steel of a definite composition wherein the proportions of carbon or other ingredients must be small and reasonably exact, so that, consequently, the operation requires great care, and it is the object of the present invention to produce the very highest grade of steels of any desired carbon content or a steel alloy of any desired composition from titaniferous ores or iron sands at a cost which is less than, or will compare favourably with, the cost of producing steel from other ores or by other processes.

According to the present invention, steel, or any desired steel alloy, is obtained directly from titaniferous ores or iron sands in a single heating operation and to this end, the ores or the iron sands are first subjected to a process of magnetic separation and the concentrate is reduced in an electric furnace, the process of reduction being carried on in such a manner that, although the iron oxide and other oxides present in the ores or the sands are reduced, sufficient carbon or other reducing agent is not added to reduce the titanium oxide to metallic titanium. When the process of reduction is complete the liquid slag is either drawn off from the electric furnace, or else the metal is run, while still molten, into an adjacent electric furnace and thereafter a process of refining is carried on so as to produce pure iron with any desired degree of carbon content, and, by the requisite addition of carbon or metal alloys, the still liquid metal is converted into steel or a steel alloy of any desired specification or composition. Consequently, steel or any desired steel alloy is obtained directly from titaniferous ores or iron sands in a single operation, and the consumption of electrical energy is reduced owing to the fact that the metal, after being reduced from the ores or iron sands, is not allowed to solidify or "freeze" but is maintained molten until the completion of the process.

In cases where a separate refining furnace is employed the slag may first be drawn off before the metal is run into the refining furnace, or, the slag may be withdrawn from the reducing furnace subsequently to the metal, and the reducing furnace recharged, so that the reducing and refining processes proceed continuously. It is to be noted now that the titanium oxide passes completely or practically completely into the slag during the reducing operation and that the metallic iron, while still molten, is separated from the slag, or else the slag is removed from the furnace before the iron is refined and converted into steel, and that thereafter, and as a continuous step in the process, the molten mass is converted into steel or a steel alloy with any desired carbon content or properties. As the titanium oxide is not reduced but passes off into the slag it imparts special properties thereto, the slag, after treatment if necessary, being utilized commercially for the various purposes for which it is specially suited. If necessary, and in the case of titaniferous ores which do not exist in granular form, they may be subjected to a crushing operation and, after the ores or the iron sands have been concentrated by a process of magnetic separation, it has been found that the product resulting from the separating process in some instances contains hardly any sulphur or phosphorus but is rich in iron and titanium. Iron sands, after undergoing magnetic concentration, are similar in iron content to a good quality magnetite; viz, they contain 72% to 75% of iron oxide, yielding after the reducing operation from 50% to 53% of metallic iron, and in addition they have a content of 20% to 25% of titanium oxide, corresponding to from 12% to 15% of titanium.

During the aforesaid process no attempt is generally made to reduce the titanium which exists as an oxide in the ore but merely to obtain metallic iron and subsequently, after refining the iron, to obtain steel or a steel alloy directly from the iron sands, but the proportions of the reducing agents employed can be such that a certain amount of the titanium oxide is also reduced and passes as titanium into the iron. Normally, howeved, the titanium is not reduced, or if reduced, is only reduced temporarily, and is again re-oxidized so that is passes into the slag. The refining operation which is effected either after the slag is removed from the original furnace, within which the reducing operation is carried on, or after the iron has been run off into an adjacent electric furnace, is carried on at the usual steel refining temperatures, namely, from 1500° C. to 1600° C. A certain proportion of the slag may also be drawn off during the reducing operation, especially when the operation is carried on in a single electric furnace, but in any case the liquid slag is completely drawn off from the metal in the bath in cases where a single electric furnace is used before the refining operation is commenced.

In the case of iron sands, a suitable method of carrying on the direct manufacture of steel consists in first subjecting the same to magnetic separation so as to concentrate the ores. 1000 parts of the concentrated iron sands may then be mixed with 200 to 330 parts of anthracite, and at this stage 70 to 75 parts of lime and 15 to 30 parts of fluorspar may be admixed with the concentrated ores, or the lime and the fluorspar may be added gradually and as and when required during the reducing operation, so as to maintain the fluidity of the slag and so help the process of reduction. During the reducing operation a certain amount of calcium carbide is formed by the reaction of the lime and the coke and such calcium carbide assists in accelerating the reducing operation.

Before starting the reducing operation it is desirable to use a hot furnace; thereafter the ores or iron sands, admixed with carbon, preferably in the form of pulverized anthracite and with or without the lime and fluorspar, are added to the furnace until the latter is about three quarters full. The furnace employed is preferably one of the Greaves-Etchell type with overhead electrodes and with or without bottom electrodes, three or four phase current being used. Provision may also be made for rotating, in any known manner, the body of the furnace so as to assist the reducing operation and concentrate the slag and the metal, or the furnace may itself be stationary and the charge, when liquid, may be adapted to be rotated in known manner by providing a rotating electro-magnetic field at or towards the base of the furnace. After the furnace has been charged the electrodes are lowered into contact with the material which is to form the bath and the current is turned on. The electrodes are then raised thus resulting in the formation of an arc or arcs and the heating operation commences. Reduction occurs in the neighbourhood of 1300° C. to 1500° C. and a sufficient temperature is maintained until reduction is complete. Furthermore, the presence of the titanium oxide in the ores serves to eliminate or prevent the introduction of nitrogen and also to assist in liberating oxygen and the metal finally produced is denser than the metal produced from other ores.

In the case of magnetic oxide of iron the reaction is as follows:—

$$Fe_3O_4 + 4CO = Fe_3 + 4CO_2.$$

As soon as reduction of the bath commences or is active, which will be clear from the state of effervescence of the bath, additional quantities of the concentrated ores may be added to utilize to the full the reducing condition of the bath. The reducing operation commences as soon as sufficient temperature is obtained, and the time taken to complete the reducing operation depends on the size of furnace employed or the method adopted for the disturbing or rotating the charge, and on the chemical composition of the ore or sand. The condition of the liquid slag can be controlled in various ways; for example, by changing the temperatures at which the reaction takes place. This may be done by varying the amperage or by varying the quantity of fluxes used or both methods may be employed. A further method is to vary the length of time during which the material is allowed to remain in the reaction zone before being slagged, by adding excessive quantities of the fluxing material (namely the powdered anthracite, lime and fluorspar). Consequently, little or no reduction of titanium oxide takes place. It has been found desirable in practice, however, to control the fluidity of the slag in such a manner that the reduction is assisted and not retarded. If the fluidity is excessive, the lining is attacked; again, if the slag is too pasty the free movement necessary to ensure that the unreduced material is brought into the reducing zones is not obtained.

It will be understood, however, that the details of the process may be varied within limits which will be clear to those skilled in the art, especially when dealing with materials having different properties. The carbon content of the metal produced can be varied during the reducing operation by the addition of fluxes and made up to the desired specification after the slag has been removed, or the metal run into a continuous steel making furnace, or pure iron can first be produced by a refining operation, which follows the reducing operation, and, by suitable additions, the very mildest to the very hardest steel can be made from such pure iron. Furthermore, it will be clear that, by making suitable additions to the molten metal, the most complex of alloy steels can be produced.

In a typical case where concentrated Java sand was employed in carrying out the aforesaid continuous process the weight of sand used and the weight of steel produced, together with the total current consumption was as follows:—

Weight of sand charged (lbs.) _____ 1987
Weight of steel produced (lbs.) _____ 900
Per cent yield _____ 45.4

Current consumption employed to reduce concentrated sand to metal (Board of Trade units or kilowatt hours) _____ 1550
Current used to refine metal and to make sound steel therefrom (Board of Trade units or kilowatt hours) _____ 390

Total Board of Trade units or kilowatt hours required _____ 1940

The analysis of the steel obtained from Java sand was as follows:

| | Per cent |
|---|---|
| Carbon | .68 |
| Silicon | .08 |
| Manganese | .50 |
| Sulphur | .024 |
| Phosphorus | .051 |
| Iron | 98.60 |

Among the steel alloys which can be made from steel obtained by the present process there may be mentioned those groups of alloys known as corrosion-resisting steels, acid-resisting steels and heat-resisting steels.

These steels (so called steels because iron and carbon enter as essential constituents in their composition) resist in a greatly enhanced degree the action of the atmosphere, sea water, fresh water, chemical reagents of many kinds either in liquid or gaseous form, as also the deteriorating effect of heat up to very high temperatures.

It has been found that a fairly high per cent content of chromium is necessary in order to resist the corrosive action of the atmosphere as also the staining effect of various liquids, while a high per cent of nickel and chromium in varying degrees is necessary to resist the action of various acids and other liquids or the hot gases present in furnaces, internal combustion engines, etc.

Other elements, such as tungsten, molybdenum, cobalt, silicon, manganese, etc., are also added in small or large proportions to aid in the resistance of the alloy to these attacking media.

The element iron is generally the largest single constituent present in these various alloys, and as iron made by the various well-known processes behaves differently to, say, atmospheric corrosion, and as it is generally recognized that the source and purity of the iron determines in large degree its resistance to corrosion, the pure iron that can be made by the present process with its lower nitrogen, oxygen and sulphur content improves the character of these various alloys.

There is direct evidence also that greater strength is obtained by the use of iron obtained by the present process.

Suitable alloys for the aforesaid purposes may be made from the iron produced by the present process and one or more of the following elements:—

Carbon from .05 up to 3%.
Chromium from 10 to 30%.
Nickel up to 50%.
Silicon from .2 to 5%.
Manganese from .4 to 10%.
Tungsten, molybdenum, vanadium, cobalt, copper, aluminium, may also be present in varying percentages up to 10%, the iron produced by the present process constituting the remainder.

It has been found that the novel process of making steel or steel alloys directly from concentrated titaniferous ores or iron sands as aforesaid has an unsuspected beneficial result upon the mechanical and physical properties of the steel or steel alloys so produced and comparisons and tests made between steel produced by other methods and steel produced by the present process show that the latter is vastly superior as regards yield, maximum stress, ductility, fatigue and wear to ordinary steel.

What we claim and desire to secure by Letters Patent of the United States:—

A continuous method of producing steel in a single operation directly from titaniferous ores which consists in first concentrating the ores when in a finely divided state by a process of magnetic separation; admixing a reducing agent with the concentrate; subjecting the reducing agent and the concentrate to heat treatment in an electric furnace so as to slag the impurities in the form of a liquid slag and reduce the metal to a molten state; controlling the temperature of the bath during the main portion of the reducing operation so that it does not exceed but approximates to 1600° C. to prevent reduction of titanium oxide in the slag or ore whereby the titanium oxide passes as such into the slag; separating the liquid slag from the molten metal; refining the molten metal to produce iron, and adding carbon to the still molten metal so as to convert the molten iron into steel.

FRANZIE ANTOINETTE de SILVA.
CHARLES GEORGE CARLISLE.